(No Model.)
R. RODES, Jr.
BICYCLE HANDLE.
No. 353,504.  Patented Nov. 30, 1886.
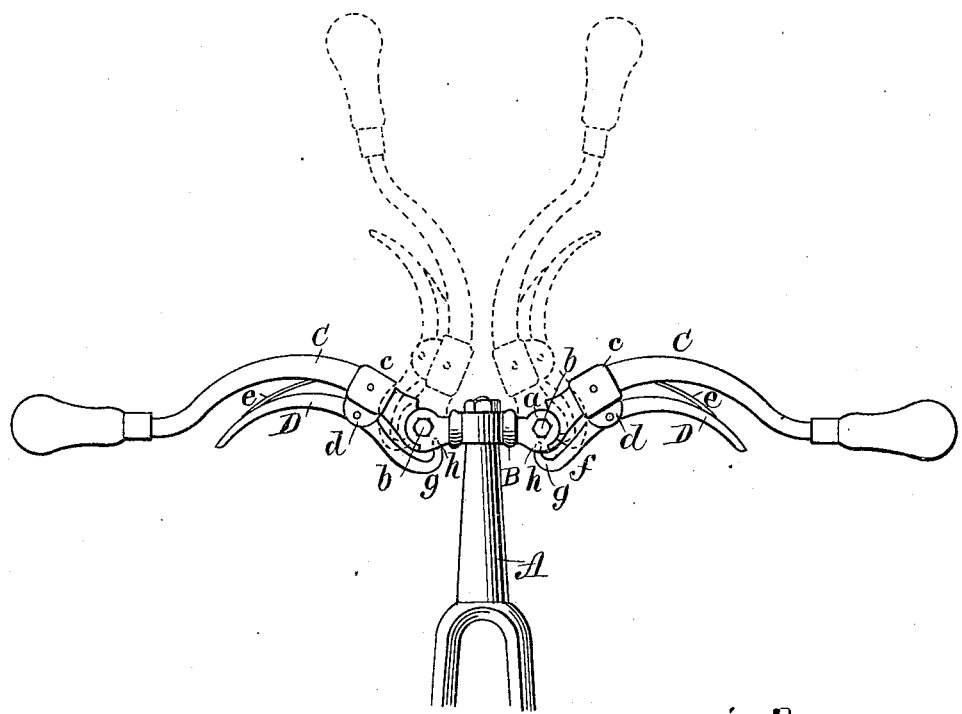
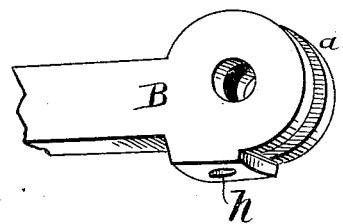
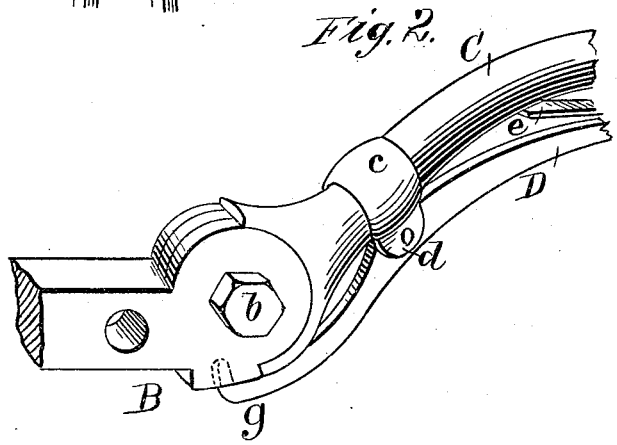
WITNESSES:
INVENTOR:
R. Rodes Jr
BY Munn & Co
ATTORNEYS.

UNITED STATES PATENT OFFICE.

ROBERT RODES, JR., OF NASHVILLE, TENNESSEE.

BICYCLE-HANDLE.

SPECIFICATION forming part of Letters Patent No. 353,504, dated November 30, 1886.

Application filed March 13, 1886. Serial No. 195,094. (No model.)

*To all whom it may concern:*

Be it known that I, ROBERT RODES, Jr., of Nashville, in the county of Davidson and State of Tennessee, have invented a new and useful Improvement in Bicycle-Handles, of which the following is a specification, reference being had to the annexed drawings, in which—

Figure 1 is a side elevation of my improved bicycle-handle. Fig. 2 is an enlarged perspective view of one of the joints of the handle. Fig. 3 is an enlarged perspective view of the fixed portions of the handle-joint.

Similar letters of reference indicate corresponding parts in all the figures of the drawings.

My present invention is an improvement upon the bicycle-handle for which Letters Patent No. 325,014 were granted to me August 25, 1885.

The object of my invention is to simplify and at the same time render more positive the fastening of the handle.

My invention consists in the combination, with the bicycle-handles, of curved levers pivoted to the handle and provided with hooks on their shorter arms, which are received in holes formed in the under side of the cross-arm, to which the handles are jointed.

To the upper end of the step A, in the fork of which the driving-wheel is journaled, is secured a cross-arm, B, having on its opposite ends ears $a$, between which are pivoted the ends of the handles C upon bolts $b$. To each handle C is secured a ring, $c$, provided with ears $d$, between which is pivoted the lever D, whose curvature is approximately the same as that of the handles C. The longer arm of the lever D is provided with a spring, $e$, which presses it downward, and tends to throw the shorter arm, $f$, of the lever upward toward the under surface of the handle. The extremity of the shorter arm, $f$, of the lever D is bent to form a hook, $g$, which is received in a cavity, $h$, in the bottom of the arm B, when the handle C is in its normal position, thus holding the handle in position for use.

The longer arms of the lever D are normally above the knees of the bicycle rider; but when the rider is thrown forward his knees will strike the longer arms of the lever D, turning them on their pivots, thus disengaging the hooks $g$ from the cavities $h$, when the handles will fold upward, as indicated in dotted lines in Fig. 1, thus permitting the rider to escape from the bicycle without becoming entangled with the handles.

Having thus fully described my invention, what I claim as new, and desire to secure by Letters Patent, is—

The combination, with the arm B, having upward-extending cavities $h$ $h$ in its lower edge, near its opposite ends, of the vertically-swinging handles pivoted at the ends of the arm B and the curved spring-acted levers D, pivoted between their ends to the under sides of the handles and provided with upward-extending hooks $g$, entering the cavities $h$ $h$ in the arm B, substantially as set forth.

ROBT. RODES, JR.

Witnesses:
H. G. DIATIKAR,
JNO. JOHNS.